(12) United States Patent
Bernsen et al.

(10) Patent No.: US 9,240,980 B2
(45) Date of Patent: Jan. 19, 2016

(54) MANAGEMENT OF GROUP SECRETS BY GROUP MEMBERS

(75) Inventors: Johannes Arnoldus Cornelis Bernsen, Eindhoven (NL); Antonius Adriaan Maria Staring, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2 days.

(21) Appl. No.: 14/345,833

(22) PCT Filed: Sep. 14, 2012

(86) PCT No.: PCT/IB2012/054811
§ 371 (c)(1),
(2), (4) Date: Mar. 19, 2014

(87) PCT Pub. No.: WO2013/046088
PCT Pub. Date: Apr. 4, 2013

(65) Prior Publication Data
US 2014/0223181 A1    Aug. 7, 2014

Related U.S. Application Data

(60) Provisional application No. 61/539,723, filed on Sep. 27, 2011, provisional application No. 61/587,269, filed on Jan. 17, 2012.

(51) Int. Cl.
*H04L 9/32* (2006.01)
*H04L 29/06* (2006.01)
*H04L 9/08* (2006.01)

(52) U.S. Cl.
CPC .......... *H04L 63/0428* (2013.01); *H04L 9/0833* (2013.01); *H04L 9/0891* (2013.01); *H04L 63/065* (2013.01)

(58) Field of Classification Search
CPC . H04L 63/0428; H04L 63/065; H04L 9/0833; H04L 9/0891
USPC .................................................. 713/168, 171
See application file for complete search history.

(56) References Cited

U.S. PATENT DOCUMENTS 5,825,880 A * 10/1998 Sudia ...................... G06F 21/40
380/286
8,799,656 B2 * 8/2014 Brickell ................ H04L 9/0844
380/282

(Continued)

OTHER PUBLICATIONS

Amos Fiat et al: "Broadcast Encryption", Advances in Cryptology (Crypto). Santa Barbara, Aug. 22-26, 1993; [Proceedings of the Annual Intl Cryptology Conference (Crypto)], Berlin, Springer, DE, pp. 480-491, XP019194081.

(Continued)

*Primary Examiner* — Thu Ha Nguyen
(74) *Attorney, Agent, or Firm* — Larry Liberchuk

(57) ABSTRACT

A method of adding a new device (121) to a device group (110), wherein the device group comprises at least one device (111) that hosts a trusted module (151), the method including: generating keys of the trusted modules (151, 153) and devices (111, 112, 113, . . . , 11N) in the device group and a key of the new device (121); distributing the generated keys to the trusted modules (151, 153) in the device group (110); distributing the generated keys to the devices in the device group, such that each device in the device group receives the key of the new device, the keys of the trusted modules and of all other devices in the device group, except for its own key; establishing a secure authenticated channel (130) between the trusted module (151) and the new device (121); and sending to the new device (121) the generated keys except for the key of the new device.

18 Claims, 5 Drawing Sheets

(56) References Cited

U.S. PATENT DOCUMENTS

| | | | | |
|---|---|---|---|---|
| 2002/0013898 | A1* | 1/2002 | Sudia | G06Q 20/02 713/155 |
| 2003/0056114 | A1* | 3/2003 | Goland | H04L 63/04 726/5 |
| 2003/0097570 | A1* | 5/2003 | Wheeler | G06F 21/32 713/180 |
| 2006/0179303 | A1* | 8/2006 | Gurleyen | H04L 63/104 713/167 |
| 2008/0317036 | A1* | 12/2008 | Chandrasiri | H04L 29/12009 370/395.3 |
| 2009/0158030 | A1* | 6/2009 | Rasti | H04L 63/0421 713/156 |
| 2009/0199017 | A1* | 8/2009 | Lange | G06F 21/79 713/194 |
| 2009/0287837 | A1* | 11/2009 | Felsher | G06F 19/322 709/229 |
| 2010/0317420 | A1* | 12/2010 | Hoffberg | G06Q 30/0207 463/1 |
| 2011/0072502 | A1* | 3/2011 | Song | G06Q 10/10 726/9 |
| 2013/0046972 | A1* | 2/2013 | Campagna | H04L 9/0841 713/156 |
| 2014/0095293 | A1* | 4/2014 | Abhyanker | H04L 67/18 705/14.41 |
| 2014/0289528 | A1* | 9/2014 | Baghdasaryan | G06Q 20/42 713/171 |

OTHER PUBLICATIONS

Kenthapadi K. et al., "Broadcast Encryption", Nov. 11, 2003 http://infolab.stanford.edu/~dilys/dbprivacy/krishnaram/broadcast_encryption.pdf.

Daisuke Inoue et al: "FDLKH: Fully Decentralized Key Management Scheme on Logical Key Hierarchy", May 15, 2004, Applied Cryptography and Network Security; [Lecture Notes in Computer Science;;LNCS], Springer-Verlag, Berlin/Heidelberg, pp. 339-354, XP019008006.

Ju-Hyung Son et al: "Topological Key Hierarchy for Energy-Efficient Group Key Management in Wireless Sensor Networks", Wireless Personal Communications, Kluwer Academic Publishers, DO, vol. 52, No. 2, Jan. 1, 2009, pp. 359-382, XP019775630.

* cited by examiner

MANAGEMENT OF GROUP SECRETS BY GROUP MEMBERS

This invention relates to the management of group secrets and, more particularly, to a method and a system for group members to manage group secrets.

Certain embodiments herein are directed to key management of a group of devices including starting a group, expanding group membership and reducing group membership, without requiring a central authority that manages and distributes keys to the group members. Certain embodiments further allow a device of the group of devices to send secure messages to any sub-group of devices among the group members, wherein non-addressed devices cannot decrypt the message.

Message encryption schemes are known and may be based on, for example, 'Zero Message Broadcasting' (ZMB) or Broadcast Encryption'; see, e.g. Amos Fiat and Moni Naor, *Broadcast Encryption*, 1993 (hereinafter Fiat & Naor). Fiat & Naor discusses Broadcast Encryption. In general, the term 'broadcast encryption' can simply mean encryption of broadcasts. However, as introduced by Fiat & Naor the term takes on a specific meaning Fiat & Naor's 'broadcast encryption' was developed for enabling a broadcaster to securely broadcast a message to a subset of a pre-defined group of devices. The pre-defined group is called the Device Group.

The central idea in the simplest variant of Fiat & Naor's Broadcast Encryption is that each device in a Device Group possesses the Device Keys of all the other devices in the Device Group, except for its own Device Key. The Device Group may also have a Device Group Key. Note that there exists key-management procedures for large groups, such that each device only has to be issued fewer keys than the group size minus one, e.g. $^2$log (group size) keys and can compute from these keys all keys that are required.

When the broadcaster of a message wants to securely send a message to addresses of a subset of devices from the Device Group, the broadcaster puts the IDs of the addressed devices as a plaintext part of the message, and computes an encryption key that is a function of all the Device Keys of the non-addressed devices. The Device Keys of the non-addressed devices are used because the addressed devices do not have their own keys. The broadcaster encrypts and broadcasts the message. Devices in the Device Group that are not addressed cannot decrypt the message, because they do not have their own key. Devices outside the Device Group cannot decrypt the message because they do not have the keys of the non-addressed devices. Only addressed devices in the Device Group can decrypt the message. Of course, devices belonging to the Device Group have to know the algorithm to compute the message key from the Device Keys. In general, the algorithm does not have to be kept secret from others outside the Device Group.

A related concept is k-resiliency. In "Broadcast Encryption," Krishnaram Kenthapadi, Nov. 11, 2003, defines k-resiliency as follows:

In a system consisting of a set U of n users, a broadcast scheme is resilient to a set of users S if for every subset T that is disjoint from S, no eavesdropper that has all the secrets of S, can obtain "knowledge" about the secret common to T. We could either consider the information-theoretic or the computational definition of security. The scheme is k—resilient if it is resilient to any set $S \subset U$ of size k.

Another way of defining k-resiliency is that a broadcast scheme is k-resilient if at least k+1 members have to collude or work together in order to obtain all group secrets. Such an attack of combining the knowledge of a group is called a collusion attack.

The scheme described above is 1-resilient. That is simple to see with the above definition, since any group member can learn the secret it is missing, its own key, from any other group member.

Examples of existing k-resilient broadcast encryption schemes may be found in Amos Fiat and Moni Naor, *Broadcast Encryption*, 1993 and Krishnaram Kenthapadi, *Broadcast Encryption*, Nov. 11, 2003.

When adding a member to a Device Group, all old members usually are issued new group keys or perform a one-way function on the old group keys, and the new member is issued the new keys. Note that a one-way function is a mathematical function that is easy to compute for every input, but for which the inverse function is very hard to compute. By doing so, the new member cannot decrypt old messages sent to the group. This may or may not be a requirement in a practical implementation.

Sending a Message to all Devices in a Device Group

If a broadcaster outside the Device Group needs to broadcast a message to all devices in the Device Group, there is a problem with the simple scheme above, because there is no unaddressed device, so the broadcaster does not have a key to use. A solution here is to use a special Device Group Key that all devices know. One could say that this Device Group Key is the Device Key of a device that does not exist. Similar solutions exist for k-resilient schemes.

If a member of a Device Group wants to send a message to all other devices in the Device Group, it has the same problem. Therefore, in addition to the Device Keys of all other devices in the Device Group, each device also gets a Device Group Key. Thus, to send a message to all members of the Device Group, the broadcaster would use the Device Group Key.

A problem with broadcast encryption schemes is that they rely on a central authority to distribute the keys required by each device and manage membership of the group.

US Patent Application, No. 61/536,761, discloses a system where such a central authority is not required and the group devices themselves can manage Device Group set-up and management, and can further manage the keys required by each device. According to such system, adding a new device to a device group in a k-resilient scheme is performed by setting up a secure authenticated channel (SAC) between the new device and k+1 devices of the old device group. Note that the smallest allowed value for k is 1, such that the user makes connections between the new device and at least 2 other devices. If Near Field Communication (NFC) is used for the secure authenticated channel, this involves 'touching' one of the devices in the old device group with the new device and then touching at least one other device in the old device group. Note that NFC is a set of short-range wireless technologies, typically requiring a distance of 4 cm or less to initiate a connection. Since the distances involved are so short, the devices almost touch or actually touch each other when the communication channel is established. Therefore, in NFC, 'touching' means the devices are actually touching or getting very close to each other.

According to an embodiment of the present invention discussed herein, for any k-resilient scheme the number of required secure authenticated channels is reduced to only one. That means that when NFC is used for the secure authenticated channel, the user of a device only 'touches' one other device of a device group in order to add the device to the device group.

According to an embodiment of the present invention, a trusted module is added to at least one device. The trusted module contains the secrets of at least k devices for a k-resilient scheme, but preferably the secrets of all devices. The trusted module is programmed such that it makes secrets available to devices that are allowed to obtain those secrets. For example, the trusted module does not make the secrets of its hosting device known to its hosting device, because in a broadcast encryption a device is not allowed to know its own key(s). That means that although the trusted module does contain the secrets of at least k devices or virtual devices, these secrets cannot be used by any other device in a collusion attack.

The trusted module is equipped to set up a secure authenticated channel to devices outside the device it is hosted in. The secure authenticated channel facilitates secure distribution of device keys to other devices. The device keys may be device keys that it knows from its host device and that it generates itself for other devices.

According to an embodiment of this invention, the trusted module implements at least parts of a miniature key distribution center.

According to an embodiment of this invention, the trusted module is ideally suited to be combined with a secure module of an NFC processor.

In one embodiment, the invention relates to a method of adding a new device to a device group, wherein the device group comprises at least one device that hosts a trusted module, wherein each device and each trusted module hosted by a device in the device group possesses device keys for encryption of messages, the method including: generating device keys of one or more trusted modules in the device group, device keys of one or more devices in the device group and a device key of the new device; distributing the generated device keys to each of the one or more trusted modules in the device group; distributing the generated device keys to each of the one or more devices in the device group, such that each device in the device group receives the device key of the new device, the device keys of the one or more trusted modules in the device group, and the device keys of other devices in the device group, except for its own device key; establishing a secure authenticated channel between a trusted module of the one or more trusted modules and the new device; and sending to the new device the generated device keys, except for the device key of the new device itself.

In another embodiment, the invention relates to a method of adding a new device to a device group, wherein the device group comprises at least one device that hosts a trusted module, and wherein the new device to be added hosts a trusted module, wherein each device and each trusted module hosted by a device in the device group possesses device keys for encryption of messages, the method including: generating device keys of one or more trusted modules in the device group, device keys of one or more devices in the device group, a device key of the new device and a device key of the trusted module hosted by the new device; distributing the generated device keys to each of the one or more trusted modules in the device group; distributing the generated device keys to each of the one or more devices in the device group, such that each device in the device group receives the device key of the new device, the device key of the trusted module hosted by the new device, the device keys of the one or more trusted modules in the device group and the device keys of other devices in the device group, except for its own device key; establishing a secure authenticated channel between a trusted module of the one or more trusted modules and the trusted module hosted by the new device; sending to the trusted module hosted by the new device the generated device keys; and sending to the new device the generated device keys, except for the device key of the new device itself.

In another embodiment, the invention relates to a method of adding a new device to a device group, wherein the device group includes n (n>0) devices, with at least one of the devices hosting a trusted module, wherein each device and each trusted module hosted by a device in the device group possesses key material with which it can encrypt messages to the whole device group or to any subset of the device group, such that only addressed devices can decrypt the messages under a k-resilient scheme (k>1), the method including: generating, for subsets of the device group that have at most k−1 members, extended with the new device, so for subsets of at most k member devices, key material per subset to encrypt messages that can be decrypted by all devices except the devices in the subset of the device group and except the new device; distributing the generated key materials to one or more trusted modules in the device group; distributing the generated key material per subset to devices in the device group that are not part of the subset of the device group; establishing a secure authenticated channel between the trusted module and the new device; and sending to the new device generated device key materials except key materials of the subsets to which the new device belongs.

In another embodiment, the invention relates to a method of adding a new device to a device group, wherein the device group includes n (n>0) devices, with at least one of the devices hosting a trusted module, wherein the new device to be added hosts a trusted module, wherein each device and each trusted module hosted by a device in the device group possesses key material with which it can encrypt messages to the whole device group or to any subset of the device group, such that only addressed devices can decrypt the messages under a k-resilient scheme (k>1), the method including: generating, for subsets of the device group that have at most k−1 members, extended with the new device, so for subsets of at most k member devices, new key material per subset to encrypt messages that can be decrypted by all devices except the devices in the subset of the device group and except the new device; distributing the generated key materials to one or more trusted modules in the device group; distributing the generated key material per subset to devices in the device group that are not part of the subset of the device group; establishing a secure authenticated channel between the trusted module hosted by the at least one of the devices in the device group and the trusted module hosted by the new device; sending the generated device key materials to the trusted module hosted by the new device; and sending to the new device the generated key materials except key materials of the subsets to which the new device belongs.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention are apparent from the following detailed description taken in conjunction with the accompanying drawings.

According to the previously disclosed system in U.S. Patent Application No. 61/536,761, in a k-resilient system broadcast encryption system, k+1 secure authenticated channels are set up in order to add a device to a device group. For a k-resilient system, at least k+1 devices come together in order to obtain all key material of a device group. The most simple broadcast encryption scheme is 1-resilient, requiring the set-up of 2 secure authenticated channels in order for a device to be added to a device group to obtain all key material of a device group.

In an embodiment of the invention disclosed herein, in a k-resilient system broadcast encryption system, only one secure authenticated channel is set-up when adding a device to a device group. For example, setting up a secure authenticated channel from a device to be added to another device of the group may be done using NFC, which involves 'touching' one device with the other device. In this embodiment, the user 'touches' only one device instead of two or more, which may advantageously be more convenient and intuitive for the user. Note that removing a device from a device group does not require a secure authenticated channel.

According to one embodiment of the invention, at least one of the devices in a device group hosts a trusted module. This trusted module can generate, manipulate and exchange secrets, such that the device hosting the trusted module cannot learn secrets that the device is not supposed to know. For example, the trusted module may host the device key for the device hosting the trusted module, where the device holding the trusted module may not learn its own device key. Therefore, when at least one of the devices in the device group hosts a trusted module, a new device can be added to a device group by interacting with the trusted module, even when there is no external party generating and distributing keys.

The examples worked out herein are for a 1-resilient scheme. These examples may be generalized to a k-resilient scheme.

Figure 1:
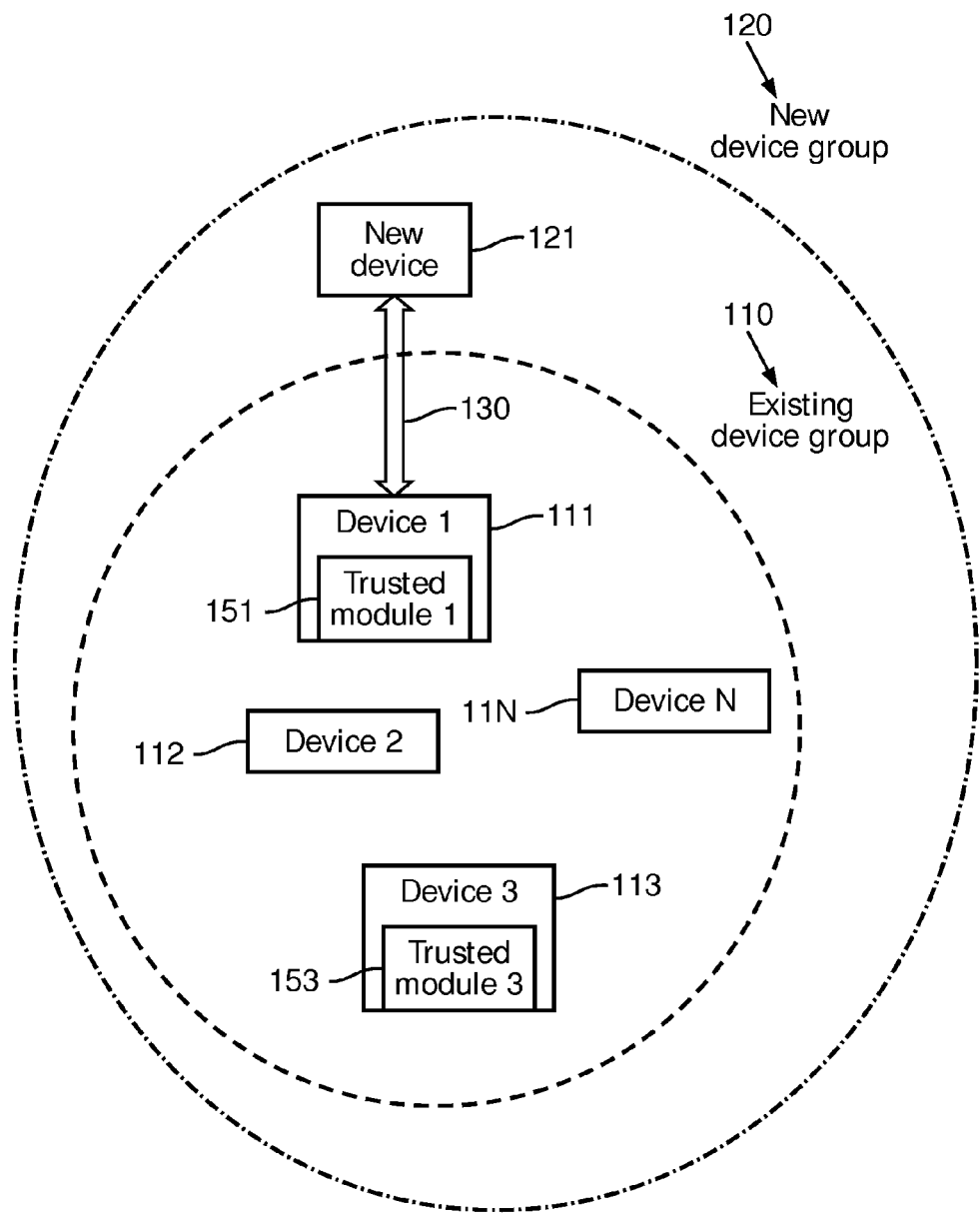
FIG. 1 shows a new device group that is formed when a new device is added to an existing device group according to an embodiment of the invention.

FIG. 1 shows a new device 121 being added to an existing device group 110 according to one embodiment of the invention. When a device is added or removed from the existing device group 110, a new device group 120 is created. The new device group 120 is also referred to as a next generation device group. Each generation of a device group may have its own set of key material. When a new device is added to a device group to create a next generation device group, one or more of the trusted modules and devices in the device group create the key material of the next generation device group. Thus, a generation j device group includes generation j device keys.

As shown in the example of FIG. 1, a new device 121 is added, creating the next generation device group 120, through interaction with a device 111 belonging to the existing device group via a secure authenticated channel 130. The device 111 hosts a trusted module 151 which may generate and distribute the device keys to the device 121. According to an embodiment herein, in order to add the new device in a k-resilient broadcast encryption system, only one secure authenticated channel is required when adding the device to the device group. Thus, of these two devices, at least the device 111 that is already a member of the existing device group hosts a secure module. There is no requirement that new device 121 hosts a trusted module. Likewise, among the devices 111, 112, 113, . . . , 11N, there may be multiple trusted modules 151, 153 hosted by their respective devices 111, 113 in the device group. However, each device does not require a trusted module. A trusted module is not required when a member of a device group is removed from a device group.

For a 1-resilient broadcast encryption scheme, at the end of the creation of generation j device group, the following rules are implemented according to one embodiment of the invention.

Rule 1. The trusted modules that are hosted by devices that are part of generation j device group know all generation j device keys (both of trusted modules and of devices).

Rule 2. The devices of generation j device group know all generation j device keys (both of trusted modules and devices), except their own device key(s).

Rule 3. The devices that are not part of generation j device group do not know any generation j device keys (both of trusted modules and of devices).

Rule 4. The trusted modules that are hosted by devices that are not part of generation j device group do not know any generation j device keys (both of trusted modules and of devices).

For a k-resilient broadcast encryption scheme, a device is not allowed to know the key associated with any subset of devices of which subset it is a member.

To ensure that messages exchanged between the devices of the previous generation device group cannot be read by any newly added devices, new keys are generated for the next generation device group. This is also necessary in the device addition procedure for being able to distribute the key(s) of the new device to the devices of the previous generation device group, without the new device getting to know its own key(s).

Next generation device key may be created using a one-way function on the current device key or by selecting a random number. Selecting a random number may be useful for the case where no previous generation keys are available or in the case of removing a device from the device group.

A 'trusted module' includes one or more of the below properties according to varies embodiments.

Property 1. The trusted module may be configured to generate and store secrets, such as secret numbers or secret keys, using a random number generator.

Property 2. The trusted module may be configured to use a one-way function on a secret in order to generate the next generation version of that secret as an alternative to using a random number generator. This feature may be restricted by security considerations.

Property 3. The trusted module may be configured to address the secrets for manipulations using a device group identifier, an index, and using a device group generation number. Through the device group identifier and generation number, the secret is linked to a certain generation of a certain device group. Through the index, the secret is linked to a device, a set of devices or a sub-set of devices. These three numbers uniquely address a secret in a trusted module.

Property 4. The trusted module may be configured to construct encryption or decryption keys according to a fixed algorithm and using the secret keys it has stored, as indicated by their indexes and generation number. For example, the trusted module may create an encryption key using secret values 2 and 5, both for device group 6 of generation 10.

Property 5. The trusted module may be configured to encrypt some of its secret numbers with a constructed encryption key and make this encrypted value available on one of its interfaces.

Property 6. The trusted module may be configured to decrypt a message it receives on one of its interfaces with a constructed decryption key and store the decrypted contents securely.

Property 7. If a decrypted message contains secrets together with their index and generation number, the trusted module may be configured to use these secrets in future manipulations where these keys are addressed with their index and generation number.

Property 8. The trusted module may be configured to set up a secure authenticated channel with another trusted module.

Property 9. The trusted module may be configured to set up a secure authenticated channel with a device, other than the one it is hosted in, that does not host a trusted module. This means that the device that hosts the trusted module cannot read the traffic between the trusted module and the other device that does not host a trusted module.

Property 10. The trusted module may be configured to transfer secrets, together with their index and generation number, over the above secure channels.

Property 11. The trusted module may be configured to securely transfer a selective set of secrets to its host device in a manner which prevents its host from obtaining secrets that its host is not allowed to know. The trusted module should be certain that it is communicating with its own host device. This may be accomplished by, for example, setting up a secure authenticated channel to the host device. This secure authenticated channel may be similar to the secure authenticated channel with a device, other than the one it is hosted in as set up in Property 9. The host device may be configured to not being able to assume more than one identity for setting up this secure authenticated channel.

Property 12. The trusted module may be configured to receive keys from the device by which it is hosted and have each of these keys linked to a different set of a device group identifier, an index and a device group generation number.

According to one embodiment, a device has one or more of the following properties:

Property 21. If a device hosts a trusted module, it may be configured to receive keys from its trusted module in such a way that it is very difficult or impossible for the device to assume more than one identity, otherwise the device can apply a collusion attack with its multiple identities.

Property 22. If a device does not host a trusted module, it may be configured to set up a secure authenticated channel with the trusted module in other devices. It is made very difficult or impossible for the device to assume more than one identity for setting up this secure authenticated channel, otherwise the device can apply a collusion attack with its multiple identities.

Property 23. The device may be configured to store keys it has generated in the trusted module that it hosts, linking each of these keys to a different set of a device group identifier, an index and a device group generation number.

The following notations are used in the example scenarios according to some embodiments, where a 1-resilient broadcast encryption scheme is used. Since only one device group is involved in the following examples, the device group identifier has been omitted for clarity. In general, trusted modules and devices have sets of keys for more than one device group.

$D(i)$ denotes device i. The index i is an identifier of the device. The index i can be used as part of the address of a secret in a trusted module.

$T(i)$ denotes trusted module i. The index i is an identifier of the trusted module. The index i can be used as part of the address of a secret in a trusted module.

$K_j(i)$ is the j-th generation of the key of device i. The index i is an identifier of the device and j is the generation number. The index i and generation number j can be used as parts of the address of a secret in a trusted module.

$Q_j(i)$ is the j-th generation of the key of trusted module i. The index i is an identifier of the trusted module and j is the generation number of a device group. The index i and generation number j can be used as parts of the address of a secret in a trusted module.

Figure 5:
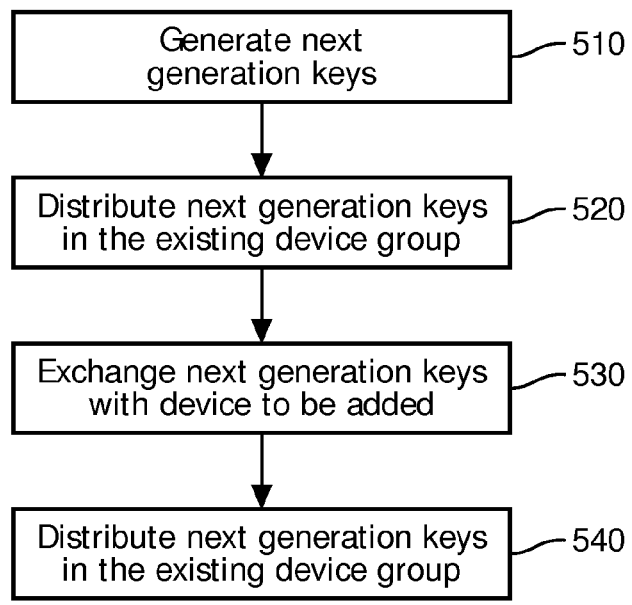
FIG. 5 shows a flow chart of adding a device to a device group according to an embodiment of the invention.

FIG. 5 shows the general steps for adding a device to a device group according to an embodiment of the invention. The steps described in FIG. 5 do not specify a specific device or trusted module which is generating the next generation keys when adding a device to a device group.

There are two distinct initial situations:

(1) The first situation is when a new device group is created. This is done by 'bringing together' two devices that are both not a member of the device group. At least one of the two devices host a trusted module. Thus, a device is added to a device group of size one.

(2) The second situation is when a device is made a member of an existing device group. This is done by 'bringing together' the new device with one of the devices that is a member of the existing device group. Of these two devices, at least the device that is already a member of the existing device group hosts a secure module.

The phrase 'bringing together' indicates here that a secure authenticated channel is set up. This channel is setup between the trusted modules, if both devices host one, or between the trusted module and the other device, in case just one of the devices hosts a trusted module. The term 'bringing together' is inspired by the action of securely making a connection between two NFC modules when one of them is touched with the other.

In general, the following process is performed when adding a device to a device group of size one or larger.

Without loss of generality, it is assumed here that that $D(1)$ is the device that belongs to the existing device group and through which the new device is added. $D(1)$ hosts a trusted module $Q(1)$.

As shown in FIG. 5, the first two general processes performed when adding a device to a device group are as follows:

Step 510: Generation of Next Generation Keys

Next generation device keys are generated for the devices of the new device group and for the trusted modules that the devices host. These can be generated by $Q(1)$, the secure module that is hosted by $D(1)$, the device that is already part of the existing device group. This a simple key generation scheme.

However, some or all of the next generation keys may be generated by other devices, as specified below. If one or more keys are going to be generated by other devices, some scheme is used to distribute the work of generating the keys and ensuring that all keys are generated. Numerous methods exist for such a scheme are not described in detail herein.

The new device and the devices that are already part of the existing device group may generate next generation device keys for some or all other devices in the new device group and for some or all of the trusted modules that they host. However, devices cannot generate keys for themselves (Rule 2). Therefore, another device or a trusted module generates the key for that device.

Any trusted module either hosted by the new device or the devices that are already part of the existing device group may generate next generation device keys for some or all other devices in the new device group and for some or all of the trusted modules that they host.

Devices or trusted modules that have previous generation keys can generate the next generation keys from these previous generation keys using a one-way function. In this case, devices and trusted modules that possess these previous generation keys can generate the next generation keys by themselves and these so generated next generation keys have only to be distributed to devices and trusted modules in the new device group that did not possess previous generation device keys. The latter devices use the keys provided by the devices or trusted module that generated the next generation keys and are prevented from using keys they have possibly generated themselves with a random number generator.

When a previous device key does not exist or is not known by the generating device or trusted module, a random number generator may be used for the generation of a next generation key. One of the devices or trusted modules, using the random number generator, generates the next generation key and distributes this key to the other devices or trusted modules for their use.

In the following, a way to generate encryption keys is mentioned. In addition, the encryption key may be generated using a function of the key(s) indicated below and any of the previous generation keys of the trusted modules, since all of the devices and trusted modules in the existing device group possess these keys.

Step 520: First Distribution of Next Generation Keys in the Existing Device Group Trusted modules hosted by devices of the existing device group as well as devices of the existing device group can distribute the next generation key that they have generated for a particular device of the existing device group by encrypting this next generation key with the previous generation device key of that particular device. All trusted modules hosted by devices of the existing device group and all devices of the existing device group except the device for which this key is generated can read this message. Thus, the next generation key is distributed to all trusted modules and devices except for the particular device.

Trusted modules hosted by devices of the existing device group as well as devices of the existing device group can distribute the next generation key that they have generated for a trusted module hosted by a device of the existing device group by encrypting this next generation key with the previous generation device key of that trusted module.

In case the generating device or trusted module does not have previous generation keys, it uses the secure authenticated channels it can set up for the distribution of the keys (see Properties 8, 9, 10 11, 21, and 22). A device uses Property 23 and Property 12 to transfer keys it has generated to the trusted module that it hosts.

Step 530: Exchange of Next Generation Keys with Device to be Added

There are two variations of this feature:

Variation 1, the Device to be Added Hosts a Trusted Module

Figure 2:
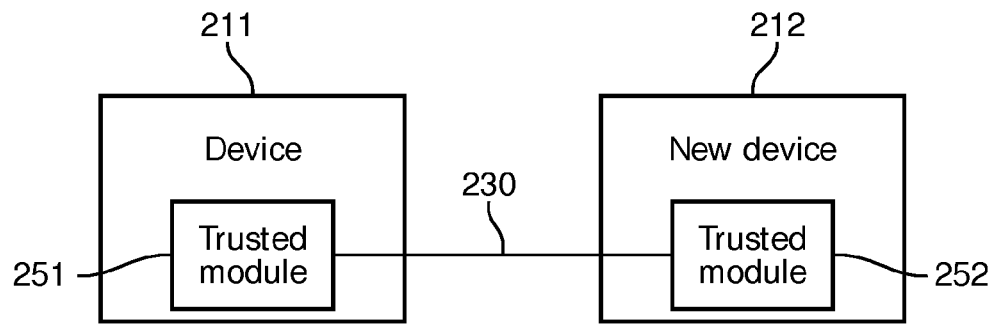
FIG. 2 shows a secure authenticated channel between two trusted modules according to an embodiment of the invention.

As shown in FIG. 2, a new device 212 hosting a trusted module 252 is to be added to a device group including device 211 hosting trusted module 251, thereby creating a new device group. The trusted module 251 is denoted here as Q(1).

To exchange the keys, a secure authenticated channel 230 is set up between the trusted module 252 hosted by the device 212 and the device 211 hosting trusted module 251.

The trusted module 252 receives from the device 212 any next generation keys that that device 212 may have generated through Properties 12 and 23. Using the secure authenticated channel 230, any next generation keys that the trusted module 252 received from device 212 and any next generation keys the trusted module 252 may have generated are sent securely to Q(1).

Q(1) now possesses all next generation keys of the new device group.

Using the secure authenticated channel 230, Q(1) sends all next generation keys of the new device group that the trusted module 252 of the device 212 to be added does not yet possess to this trusted module 252.

Figure 4:
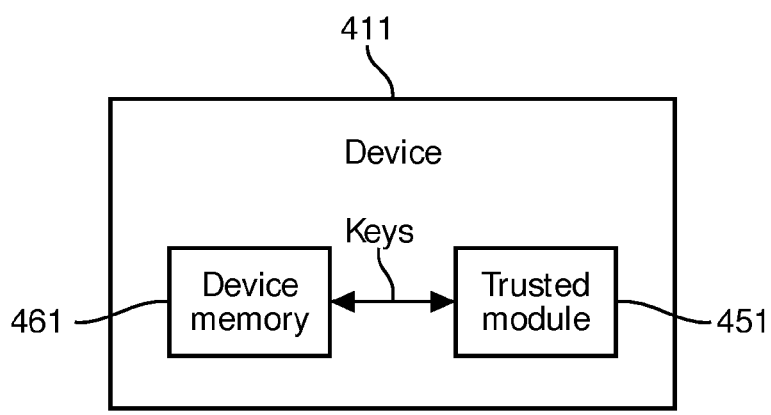
FIG. 4 shows a trusted module distributing device keys to its host according to an embodiment of the invention.

As shown in FIG. 4 and relating back to FIG. 2, the trusted module 451 (trusted module 252) hosted by the device 411 (device 212) to be added sends all next generation keys of the new device group to the device 411 in which it is hosted, except for the device key of this device 411, using Properties 11 and 21. In this example, device 411 includes a device memory module 461 to store these keys.

Variation 2, the Device to be Added does not Host a Trusted Module

Figure 3:
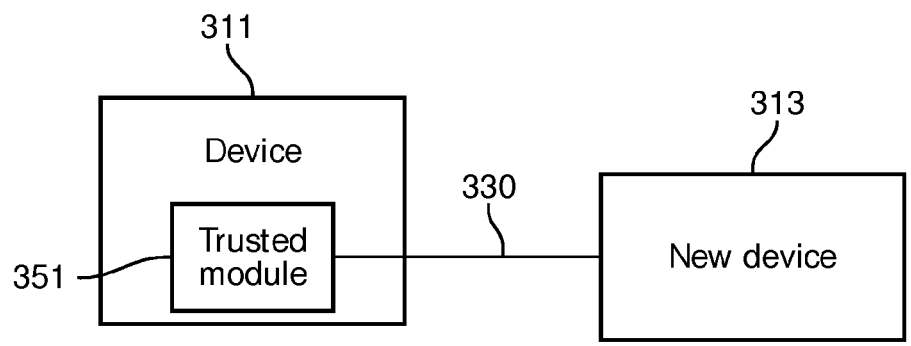
FIG. 3 shows a secure authenticated channel between a trusted module and a device according to an embodiment of the invention.

As shown in FIG. 3, a new device 313 is to be added to a device group including device 311 hosting trusted module 351, thereby creating a new device group. The trusted module 351 is denoted here as Q(1). To exchange the keys, a secure authenticated channel 330 is set up between the new device 313 to be added and device 311 hosting trusted module 351 (see Properties 9 and 22).

Using the secure authenticated channel 330, the next generation keys that the device 313 to be added may have generated are sent securely to Q(1).

Q(1) now possesses all next generation keys of the new device group.

Using the secure authenticated channel 330, Q(1) sends all next generation keys of the new device group that the device 313 to be added does not yet possess to this device 313, except for the device key of this device 313.

At the end of step 530, the device 313 to be added possesses all next generation keys that they are allowed to have.

Step 540: Second Distribution of Next Generation Keys in the Existing Device Group When Q(1) obtains any missing next generation keys in step 530, Q1 distributes these as indicated in step 520 to the devices and trusted modules of the existing device group.

Figure 6:
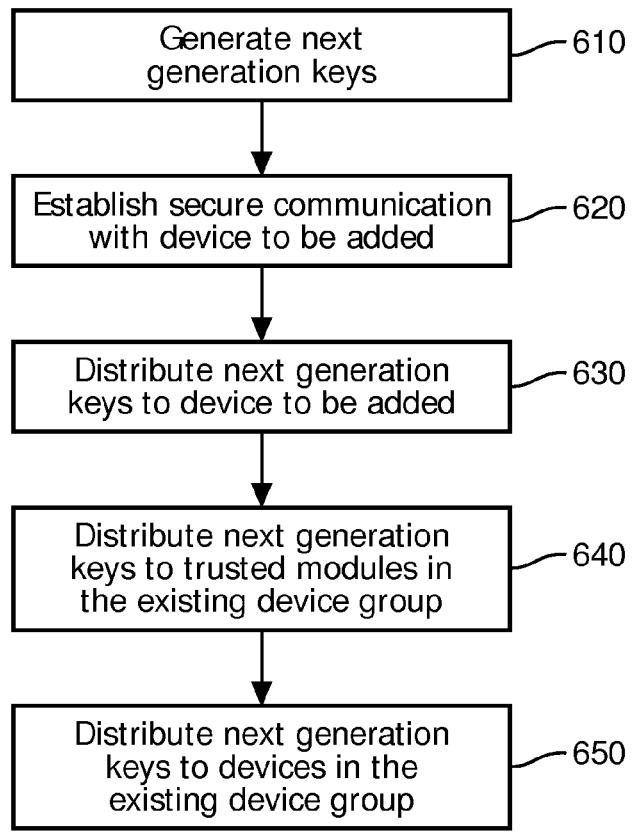
FIG. 6 shows a flow chart of adding a device to a device group according to another embodiment of the invention.

FIG. 6 illustrates another embodiment for adding a device to a device group. The embodiment is illustrated using the following examples which are directed to adding a device to a device group where the device group includes a device hosting a trusted module Q(1). The example shows Q(1) generating the next generation keys, thus the other devices and trusted modules do not have to distribute the generation of next generation keys and no scheme is required to coordinate the other device activities in key generation and distribution. However, the present invention is not limited to this scheme.

Step 610: Generation of Next Generation Keys

Using FIG. 2 to illustrate the process of FIG. 6, the trusted module 251 is designated Q(1) and generates next generation device keys for itself, its host device 211 (D1), for the device 212 to be added and for the trusted module 252 of the device 212 to be added if it hosts a trusted module and for all devices and trusted modules they host of the existing device group.

In a case where the existing device group consists of only D(1) and Q(1), the generation of the next generation keys is performed using a random number generator, since Q(1) does not possess previous generation keys.

Step 620: Secure Communication with the Device to be Added

A secure authenticated channel 230 is established between Q(1) and the trusted module 252 of the device 212 to be added if it hosts a trusted module, or with the device 212 to be added itself if that device 212 does not host a trusted module.

Step 630: Distribution of Next Generation Keys to Device to be Added

If the device 212 to be added hosts a trusted module, Q(1) uses the secure authenticated channel 230 of step 620 to send all next generation keys to the trusted module hosted by the device to be added. This trusted module 252 sends all next generation keys to the device 212 to be added, except for the device key of the device 212 itself (Properties 11 and 21).

When the device 252 does not host a trusted module, Q(1) uses the secure authenticated channel 230 of step 620 to send all next generation keys to the device to be added, except for the device key of the device to be added itself (Properties 9 and 22).

Step 640: Distribution of Next Generation Keys to Trusted Modules in the Existing Device Group Q(1) encrypts the next generation keys for the new device group using a key that is constructed from the previous-generation device keys of all the devices in the existing device group. The previous-generation keys of the trusted modules themselves may also be used but this is not necessary. This encrypted message is sent to the other devices of the existing device group and may be sent by or through the device hosting the trusted module. Upon reception of such a message, the devices make this message available to the trusted module that they host. Only the trusted modules hosted by devices from the existing device group can decrypt this message and now possess the next generation device keys of the new device group.

Step 650: Distribution of Next Generation Keys to Devices in the Existing Device Group Q(1) separately creates a message for each of the devices (including the device D(1) it is hosted by) in the existing device group. The message contains all second generation keys of the new device group, except the device key of the device for which this message is intended. The encryption key used is constructed from the previous generation device keys of all non-addressed devices of the existing device group.

The only case in which Q(1) does not have previous generation keys is when the existing device group consisted of only D(1). In this case Q(1) has to make the device key of the device to be added available to the D(1) using Properties 11 and 21.

Alternatively, devices in the old device group that host a trusted modules receive all next generation keys of the new device group, except for the device key of themselves, from the trusted module that they host, using Properties 11 and 21.

Other distribution schemes are also possible. For example, Q(1) may distribute each of the next generation device keys separately to all devices (including the device D(1) it is hosted by) in the existing device group. Device keys are encrypted with the respective previous generation device key, so a device cannot decrypt its own key. However, as previously discussed trusted modules can read their own keys though.

SOME WORKED OUT EXAMPLE SCENARIOS

The steps 610-650 shown in FIG. 6 are used in these scenarios. In case the initial situation is not mentioned, the one from the scenario immediately before is assumed.

Initial Situation—No Device Groups Formed

| Device IDs | Keys available |
|---|---|
| Device 1 | |
| Trusted module 1 | |
| Device IDs | Keys available |
| Device 2 | |
| Trusted module 2 | |
| Device IDs | Keys available |
| Device 3 | |
| Trusted module 3 | |
| Device IDs | Keys available |
| Device 4 | |
| Trusted module 4 | |

Example 1

Device 2 is Added to the Device Group Consisting of Just Device 1

Figure 7:
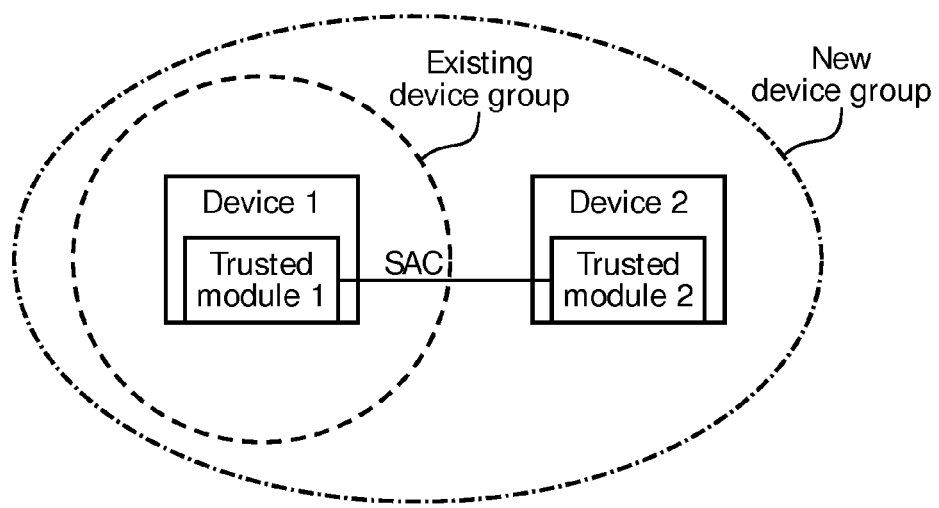
FIG. 7 shows a configuration of adding a device to a device group according to an embodiment of the invention.

The situation of Example 1 is shown in FIG. 7. For clarity, devices not part of the existing device group or the new device groups are not shown.

Step 610 (Example 1) Generation of next (first) generation keys:

Trusted modules 1 generates first generation device keys for itself, its host device (D1), for the device to be added and for the trusted module of the device to be added if it hosts a trusted module. Since it does not have previous generation keys, this is done using a random number generator.

The keys that the host device of a trusted module is not allowed to obtain are enclosed by a pair of square brackets.

| Device IDs | Keys available |
|---|---|
| Device 1 | |
| Trusted module 1 | $[K_1(1)]$, $K_1(2)$, $Q_1(1)$, $Q_1(2)$ |
| Device IDs | Keys available |
| Device 2 | |
| Trusted module 2 | |
| Device IDs | Keys available |
| Device 3 | |
| Trusted module 3 | |
| Device IDs | Keys available |
| Device 4 | |
| Trusted module 4 | |

Step 620 (Example 1) Secure communication with the device to be added:

A secure authenticated channel is established between trusted modules 1 and 2.

Step 630 (Example 1) Distribution of next (first) generation keys to device to be added:

Trusted module 1 sends all first generation keys it has to trusted module 2.

Trusted module 2 sends all first generation keys to the device 2, except for the device key of device 2 itself.

| Device IDs | Keys available |
|---|---|
| Device 1 | |
| Trusted module 1 | $[K_1(1)]$, $K_1(2)$, $Q_1(1)$, $Q_1(2)$ |
| Device 2 | $K_1(1)$, $Q_1(1)$, $Q_1(2)$ |
| Trusted module 2 | $K_1(1)$, $[K_1(2)]$, $Q_1(1)$, $Q_1(2)$ |
| Device 3 | |
| Trusted module 3 | |
| Device 4 | |
| Trusted module 4 | |

Step 640 (Example 1) Distribution of next (first) generation keys to trusted modules in the existing device group:

Since trusted module 1 is the only trusted module in the existing device group, nothing needs to be done in this step.

Step 650 (Example 1) Distribution of next (first) generation keys to devices in the existing device group:

Device 1 is the only device in the existing device group. Trusted module 1 makes all first generation keys available to all devices in the existing device group except for the device key of device 1 itself.

| Device IDs | Keys available |
| --- | --- |
| Device 1 | $K_1(2), Q_1(1), Q_1(2)$ |
| Trusted module 1 | $[K_1(1)], K_1(2), Q_1(1), Q_1(2)$ |
| Device 2 | $K_1(1), Q_1(1), Q_1(2)$ |
| Trusted module 2 | $K_1(1), [K_1(2)], Q_1(1), Q_1(2)$ |
| Device 3 | |
| Trusted module 3 | |
| Device 4 | |
| Trusted module 4 | |

At this point, the addition procedure is finished.

It can be seen that all rules (Rules 1-4) listed above are obeyed under this procedure.

Devices 1 and 2 can now exchange messages using key $Q_1(1)$, or $Q_1(2)$ or a combination of the two and no SAC is needed for the secure exchange of messages. Both trusted modules can read these messages, but that is allowable, because one cannot obtain information from these trusted modules other than information that they can make available by design.

Example 2

Figure 8:
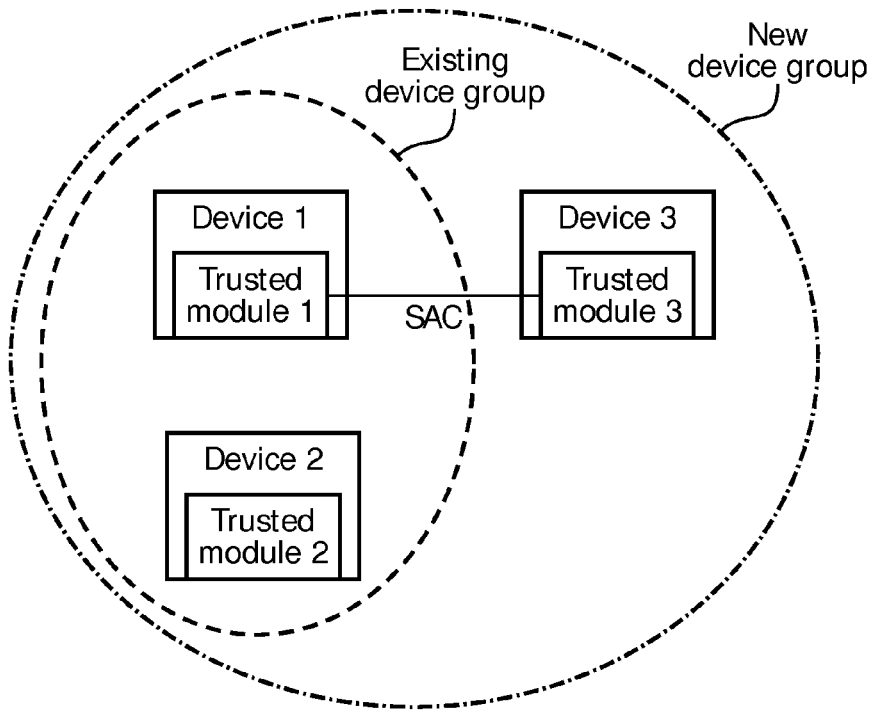
FIG. 8 shows a configuration of adding a device to a device group according to another embodiment of the invention.

Device 3 is Added to the Device Group D1, D2 Through Device 1, where Device 3 Hosts a Trusted Module The situation of Example 2 is shown in FIG. 8. For clarity, devices not part of the existing device group or the new device groups are not shown.

Step 610 (Example 2) Generation of next generation keys:

Trusted module 1 rekeys all its first generation keys in order to create second generation keys. This can be done using a one-way function or with a random number generator.

Trusted module 1 creates second generation device keys for device 3 and trusted module 3 using a random number generator.

The keys that the host device of a trusted module is not allowed to obtain are enclosed by a pair of square brackets.

| Device IDs | Keys available |
| --- | --- |
| Device 1 | $K_1(2), Q_1(1), Q_1(2)$ |
| Trusted module 1 | $[K_1(1)], K_1(2), Q_1(1), Q_1(2),$ |
| | $[K_2(1)], K_2(2), K_2(3), Q_2(1), Q_2(2), Q_2(3)$ |
| Device 2 | $K_1(1), Q_1(1), Q_1(2)$ |
| Trusted module 2 | $K_1(1), [K_1(2)], Q_1(1), Q_1(2)$ |
| Device 3 | |
| Trusted module 3 | |
| Device 4 | |
| Trusted module 4 | |

Step 620 (Example 2) Secure communication with the device to be added:

Trusted module 1 and 3 set up a secure authenticated channel.

In case device 3 does not host a trusted module, trusted module 1 has to set-up a secure authenticated channel with device 3. This is worked out in example 3 below.

Step 630 (Example 2) Distribution of next generation keys to device to be added:

Trusted module 1 sends all second generation keys it has to trusted module 3.

Trusted module 3 sends all second generation keys to the device 3, except for the device key of device 3 itself.

| Device IDs | Keys available |
| --- | --- |
| Device 1 | $K_1(2), Q_1(1), Q_1(2)$ |
| Trusted module 1 | $[K_1(1)], K_1(2), Q_1(1), Q_1(2),$ |
| | $[K_2(1)], K_2(2), K_2(3), Q_2(1), Q_2(2), Q_2(3)$ |
| Device 2 | $K_1(1), Q_1(1), Q_1(2)$ |
| Trusted module 2 | $K_1(1), [K_1(2)], Q_1(1), Q_1(2)$ |
| Device 3 | $K_2(1), K_2(2), Q_2(1), Q_2(2), Q_2(3)$ |
| Trusted module 3 | $K_2(1), K_2(2), [K_2(3)], Q_2(1), Q_2(2), Q_2(3)$ |
| Device 4 | |
| Trusted module 4 | |

Step 640 (Example 2) Distribution of next generation keys to trusted modules in the existing device group:

Trusted module 1 is encrypting all second generation keys it has using a key that is constructed from the first-generation device keys of all the devices (but not those of the trusted modules) in the existing device group ($K_1(1)$ and $K_1(2)$ in this case). This encrypted message is sent (possibly through or by its host device) to all other devices. Upon reception of such a message, the devices make this message available to the trusted module that they host. Only the trusted modules hosted by devices from the existing device group can decrypt this message (trusted module 1 and 2 in this case, but 1 is the sender).

| Device IDs | Keys available |
| --- | --- |
| Device 1 | $K_1(2), Q_1(1), Q_1(2)$ |
| Trusted module 1 | $[K_1(1)], K_1(2), Q_1(1), Q_1(2),$ |
| | $[K_2(1)], K_2(2), K_2(3), Q_2(1), Q_2(2), Q_2(3)$ |
| Device 2 | $K_1(1), Q_1(1), Q_1(2)$ |
| Trusted module 2 | $K_1(1), [K_1(2)], Q_1(1), Q_1(2),$ |
| | $K_2(1), [K_2(2)], K_2(3), Q_2(1), Q_2(2), Q_2(3)$ |
| Device 3 | $K_2(1), K_2(2), Q_2(1), Q_2(2), Q_2(3)$ |
| Trusted module 3 | $K_2(1), K_2(2), [K_2(3)], Q_2(1), Q_2(2), Q_2(3)$ |
| Device 4 | |
| Trusted module 4 | |

Step 650 (Example 2) Distribution of next generation keys to devices in the existing device group:

Trusted module 1 creates a message for each of the devices (including the device D(1) it is hosted by) in the existing device group separately (device 1 and 2 in this case). The message contains all second generation keys of the new device group, except the device key of the device for which this message is intended. The encryption key used is constructed from the previous generation device keys of all non-addressed devices of the existing device group, so the message for device 1 is encrypted with $K_1(2)$ and the message for device 2 is encrypted with $K_1(1)$.

| Device IDs | Keys available |
| --- | --- |
| Device 1 | $K_1(2), Q_2(1), Q_1(2),$ |
| | $K_2(2), K_2(3), Q_2(1), Q_2(2), Q_2(3)$ |
| Trusted module 1 | $[K_1(1)], K_1(2), Q_1(1), Q_1(2),$ |
| | $[K_2(1)], K_2(2), K_2(3), Q_2(1), Q_2(2), Q_2(3)$ |

-continued

| Device IDs | Keys available |
|---|---|
| Device 2 | $K_1(1), Q_2(1), Q_1(2),$ $K_2(1), K_2(3), Q_2(1), Q_2(2), Q_2(3)$ |
| Trusted module 2 | $K_1(1), [K_1(2)], Q_1(1), Q_1(2),$ $K_2(1), [K_2(2)], K_2(3), Q_2(1), Q_2(2), Q_2(3)$ |
| Device 3 | $K_2(1), K_2(2), Q_2(1), Q_2(2), Q_2(3)$ |
| Trusted module 3 | $K_2(1), K_2(2), [K_2(3)], Q_2(1), Q_2(2), Q_2(3)$ |
| Device 4 | |
| Trusted module 4 | |

At this point, the addition procedure is finished.

It can be seen that all rules (Rules 1-4) listed above are obeyed under this procedure.

Devices 1, 2 and 3 can exchange messages that all devices in the new device group can read using key $Q_2(1)$, or $Q_2(2)$, or $Q_2(3)$ or any combination of these.

A device (e.g. device 1) can prevent other devices (e.g. device 2) in the new device group from reading a messages by using the keys of the excluded devices ($K_2(2)$ in this example) to construct the key for encrypting these messages.

No SAC is needed for the above message exchanges.

Example 3

Figure 9:
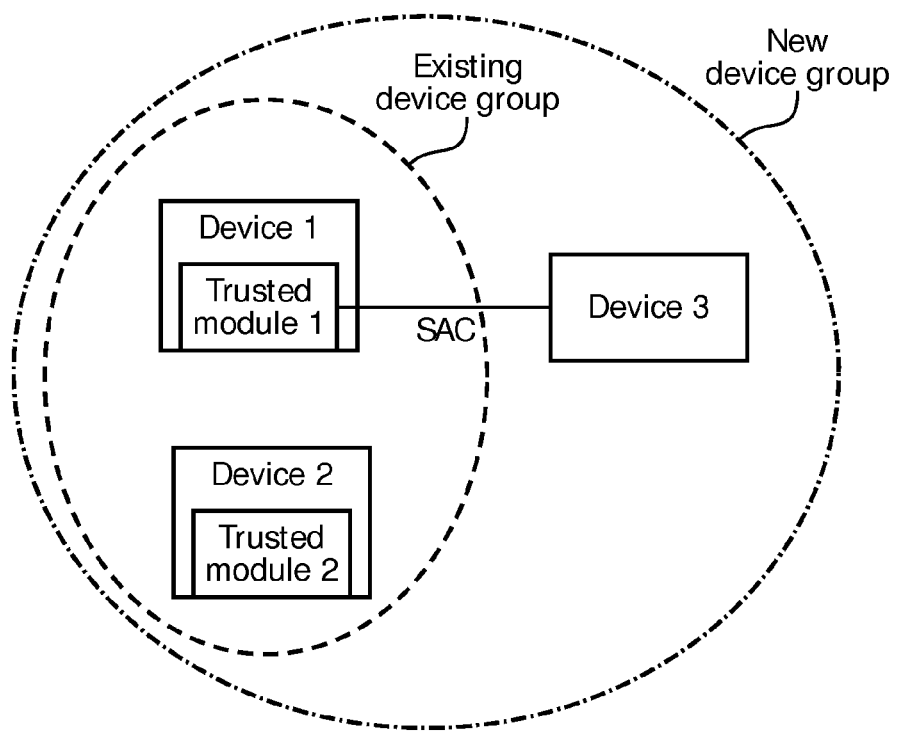
FIG. 9 shows a configuration of adding a device to a device group according to another embodiment of the invention.

Device 3 is Added to the Device Group D1, D2 Through Device 1, where Device 3 does not Host a Trusted Module The situation of Example 3 is shown in FIG. 9. For clarity, devices not part of the existing device group or the new device groups are not shown.

Initial Situation

| Device IDs | Keys available |
|---|---|
| Device 1 | $K_1(2), Q_1(1), Q_1(2)$ |
| Trusted module 1 | $[K_1(1)], K_1(2), Q_1(1), Q_1(2)$ |
| Device 2 | $K_1(1), Q_1(1), Q_1(2)$ |
| Trusted module 2 | $K_1(1), [K_1(2)], Q_1(1), Q_1(2)$ |
| Device 3 | |
| Trusted module 3 | Trusted module not present |
| Device 4 | |
| Trusted module 4 | |

Step 610 (Example 3) Generation of next generation keys:

Trusted module 1 rekeys all its first generation keys in order to create second generation keys.

This can be done using a one-way function or with a random number generator.

Trusted module 1 generates a second generation device key for device 3. Since it does not have previous (first) generation keys for device 3, this is done using a random number generator.

The keys that the host device of a trusted module is not allowed to obtain are enclosed by a pair of square brackets.

| Device IDs | Keys available |
|---|---|
| Device 1 | $K_1(2), Q_1(1), Q_1(2)$ |
| Trusted module 1 | $[K_1(1)], K_1(2), Q_1(1), Q_1(2),$ $[K_2(1)], K_2(2), K_2(3), Q_2(1), Q_2(2)$ |
| Device 2 | $K_1(1), Q_1(1), Q_1(2)$ |
| Trusted module 2 | $K_1(1), [K_1(2)], Q_1(1), Q_1(2)$ |
| Device 3 | |
| Trusted module 3 | Trusted module not present |
| Device 4 | |
| Trusted module 4 | |

Step 620 (Example 3) Secure communication with the device to be added:

Trusted module 1 sets up a secure authenticated channel with device 3.

Step 630 (Example 3) Distribution of next generation keys to device to be added:

Trusted module 1 sends all second generation keys it has to device 3 over the secure authenticated channel, except the device key for device 3.

| Device IDs | Keys available |
|---|---|
| Device 1 | $K_1(2), Q_1(1), Q_1(2)$ |
| Trusted module 1 | $[K_1(1)], K_1(2), Q_1(1), Q_1(2),$ $[K_2(1)], K_2(2), K_2(3), Q_2(1), Q_2(2)$ |
| Device 2 | $K_1(1), Q_1(1), Q_1(2)$ |
| Trusted module 2 | $K_1(1), [K_1(2)], Q_1(1), Q_1(2)$ |
| Device 3 | $K_2(1), K_2(2), Q_2(1), Q_2(2)$ |
| Trusted module 3 | Trusted module not present |
| Device 4 | |
| Trusted module 4 | |

Step 640 (Example 3) Distribution of next generation keys to trusted modules in the existing device group:

Trusted module 1 is encrypting all second generation keys it has using a key that is constructed from the first-generation device keys of all the devices (but not those of the trusted modules) in the existing device group ($K_1(1)$ and $K_1(2)$ in this case). This encrypted message is sent (possibly through or by its host device) to all other devices. Upon reception of such a message, the devices make this message available to the trusted module that they host. Only the trusted modules hosted by devices from the existing device group can decrypt this message (trusted module 1 and 2 in this case, but 1 is the sender).

| Device IDs | Keys available |
|---|---|
| Device 1 | $K_1(2), Q_1(1), Q_1(2)$ |
| Trusted module 1 | $[K_1(1)], K_1(2), Q_1(1), Q_1(2),$ $[K_2(1)], K_2(2), K_2(3), Q_2(1), Q_2(2)$ |
| Device 2 | $K_1(1), Q_1(1), Q_1(2)$ |
| Trusted module 2 | $K_1(1), [K_1(2)], Q_1(1), Q_1(2)$ |
| Device 3 | $K_2(1), K_2(2), Q_2(1), Q_2(2)$ |
| Trusted module 3 | Trusted module not present |
| Device 4 | |
| Trusted module 4 | |

Step 650 (Example 3) Distribution of next generation keys to devices in the existing device group:

Trusted module 1 creates a message for each of the devices (including the device D(1) it is hosted by) in the existing device group separately (device 1 and 2 in this case). The message contains all second generation keys of the new device group, except the device key of the device for which this message is intended. The encryption key used is constructed from the previous generation device keys of all non-addressed devices of the existing device group, so the message for device 1 is encrypted with $K_1(2)$ and the message for device 2 is encrypted with $K_1(1)$.

| Device IDs | Keys available |
|---|---|
| Device 1 | $K_1(2), Q_1(1), Q_1(2),$ |
|  | $K_2(2), K_2(3), Q_2(1), Q_2(2)$ |
| Trusted module 1 | $[K_1(1)], K_1(2), Q_1(1), Q_1(2),$ |
|  | $[K_2(1)], K_2(2), K_2(3), Q_2(1), Q_2(2)$ |
| Device 2 | $K_1(1), Q_1(1), Q_1(2),$ |
|  | $K_2(1), K_2(3), Q_2(1), Q_2(2)$ |
| Trusted module 2 | $K_1(1), [K_1(2)], Q_1(1), Q_1(2)$ |
| Device 3 | $K_2(1), K_2(2), Q_2(1), Q_2(2)$ |
| Trusted module 3 | Trusted module not present |
| Device 4 |  |
| Trusted module 4 |  |

At this point, the addition procedure is finished.

It can be seen that all rules (Rules 1-4) listed above are obeyed under this procedure.

Devices 1, 2 and 3 can exchange messages that all devices in the new device group can read using key $Q_2(1)$, or $Q_2(2)$, or any combination of these.

A device (e.g. device 1) can prevent other devices (e.g. device 2) in the device group from reading a messages by using the keys of the excluded devices ($K_2(2)$ in this example) to construct the key for encrypting these message.

No SAC is needed for the above message exchanges.

Example 4

Figure 10:
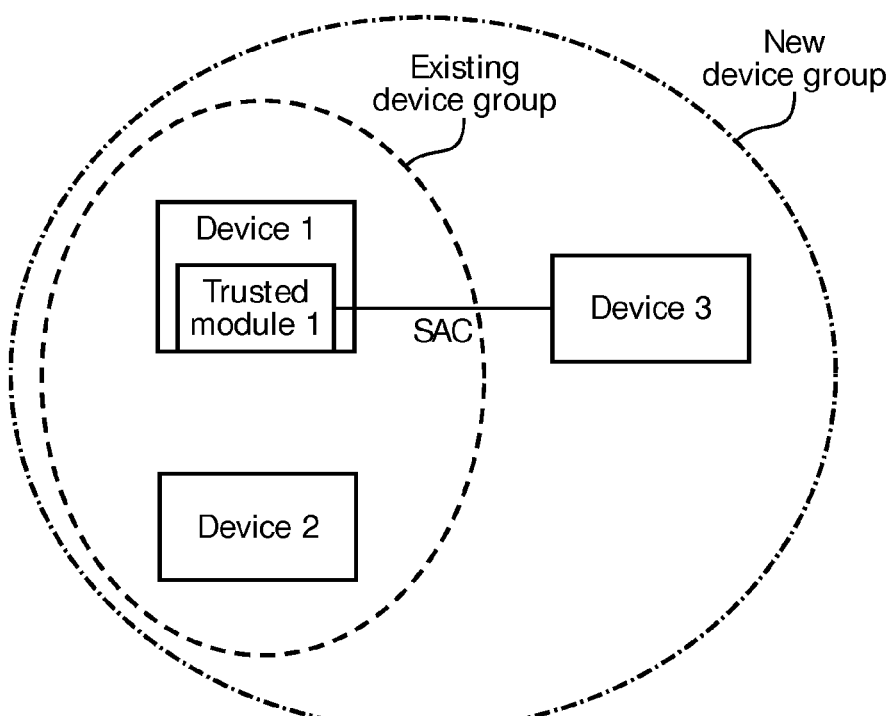
FIG. 10 shows a configuration of adding a device to a device group according to another embodiment of the invention.

Device 3 is Added to the Device Group D1, D2 Through Device 1, where Both Devices 2 and 3 do not Host a Trusted Module The situation of Example 4 is shown in FIG. 10. For clarity, devices not part of the existing device group or the new device groups are not shown.

Initial Situation

| Device IDs | Keys available |
|---|---|
| Device 1 | $K_1(2), Q_1(1)$ |
| Trusted module 1 | $[K_1(1)], K_1(2), Q_1(1)$ |
| Device 2 | $K_1(1), Q_1(1)$ |
| Trusted module 2 | Trusted module not present |
| Device 3 |  |
| Trusted module 3 | Trusted module not present |
| Device 4 |  |
| Trusted module 4 |  |

Step 610 (Example 4) Generation of next generation keys:

Trusted module 1 rekeys all its keys in order to create second generation keys. This can be done using a one-way function or with a random number generator.

Trusted module 1 generates a second generation device key for device 3. Since it does not have previous (first) generation keys, this is done using a random number generator.

The keys that the host device of a trusted module is not allowed to obtain are enclosed by a pair of square brackets.

| Device IDs | Keys available |
|---|---|
| Device 1 | $K_1(2), Q_1(1)$ |
| Trusted module 1 | $[K_1(1)], K_1(2), Q_1(1),$ |
|  | $[K_2(1)], K_2(2), K_2(3), Q_2(1)$ |
| Device 2 | $K_1(1), Q_1(1)$ |
| Trusted module 2 | Trusted module not present |
| Device 3 |  |
| Trusted module 3 | Trusted module not present |
| Device 4 |  |
| Trusted module 4 |  |

Step 620 (Example 4) Secure communication with the device to be added:

Trusted module 1 sets up a secure authenticated channel with device 3.

Step 630 (Example 4) Distribution of next generation keys to device to be added:

Trusted module 1 sends all second generation keys it has to device 3 over the secure authenticated channel, except the device key for device 3. The exchanged keys are indicated with yellow.

| Device IDs | Keys available |
|---|---|
| Device 1 | $K_1(2), Q_1(1)$ |
| Trusted module 1 | $[K_1(1)], K_1(2), Q_1(1),$ |
|  | $[K_2(1)], K_2(2), K_2(3), Q_2(1)$ |
| Device 2 | $K_1(1), Q_1(1)$ |
| Trusted module 2 | Trusted module not present |
| Device 3 | $K_2(1), K_2(2), Q_2(1)$ |
| Trusted module 3 | Trusted module not present |
| Device 4 |  |
| Trusted module 4 |  |

Step 640 (Example 4) Distribution of next generation keys to trusted modules in the existing device group:

This step is empty in this case, because no other devices in the existing device group host trusted modules.

Step 650 (Example 4) Distribution of next generation keys to devices in the existing device group:

Trusted module 1 creates a message for each of the devices (including the device D(1) it is hosted by) in the existing device group separately (device 1 and 2 in this case). The message contains all second generation keys of the new device group, except the device key of the device for which this message is intended. The encryption key used is constructed from the previous generation device keys of all non-addressed devices of the existing device group, so the message for device 1 is encrypted with $K_1(2)$ and the message for device 2 is encrypted with $K_1(1)$.

| Device IDs | Keys available |
|---|---|
| Device 1 | $K_1(2), Q_1(1),$ |
|  | $K_2(2), K_2(3), Q_2(1)$ |
| Trusted module 1 | $[K_1(1)], K_1(2), Q_1(1),$ |
|  | $[K_2(1)], K_2(2), K_2(3), Q_2(1)$ |
| Device 2 | $K_1(1), Q_1(1),$ |
|  | $K_2(1), K_2(3), Q_2(1)$ |
| Trusted module 2 | Trusted module not present |
| Device 3 | $K_2(1), K_2(2), Q_2(1)$ |
| Trusted module 3 | Trusted module not present |
| Device 4 |  |
| Trusted module 4 |  |

At this point, the addition procedure is finished.

It can be seen that all rules (Rules 1-4) listed above are obeyed under this procedure.

Devices 1, 2 and 3 can exchange messages that all devices in the new device group can read using key $Q_2(1)$.

A device (e.g. device 1) can prevent other devices (e.g. device 2) in the device group from reading a messages by using the keys of the excluded devices ($K_2(2)$ in this example) to construct the key for encrypting these messages.

No SAC is needed for the above message exchanges.

k-resilient Schemes

The methods above can also be used in a k-resilient scheme. For a k-resilient scheme, instead of a key per device, a key is generated for all subsets of size up to and including k members. Since in the methods of the preceding sections, trusted modules that are part of a certain device group need not be excluded from decrypting a message meant for other devices in that device group, only device keys are generated for the trusted modules in a k-resilient scheme and no subsets with two or more members are generated which subsets include one or more trusted modules.

Wherever the methods of the previous section mention device key, the keys belonging to subsets with a maximum size of k members of which the device is a member are used to create a key.

A device is not allowed to know the key of any subset of which it is a member (variation of Rule 2). The distribution of keys is such that this rule is not violated.

The general steps shown in FIG. 5 for adding a new device to a device group can also be applied in a k-resilient scheme.

In step 510, new key material is generated by a trusted module per subset to encrypt messages that can be decrypted by all devices except the devices in the subset of the device group and except the new device. This is to be done for subsets that have at most k−1 members of the existing device group and that do include the new device, so these are subsets of at most k member devices.

In step 520, the new key material per subset is distributed to all devices in the device group that are not part of the subset of the device group.

In step 530, the new device key materials are exchanged between the trusted module and the new device, except key materials of the subsets to which the new device belongs. To do that a secure authenticated channel is first established. The two variations are similar as those discussed above for the 1-resilient scheme.

In step 540, in case the trusted module obtains any missing new keys in step 530, the trusted module distributes these as indicated in step 520 to the devices.

This invention is applicable to devices, such as TVs, PC monitors, (digital, home) audio systems, access points, dedicated wireless docking stations, PCs.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention. For example, the process flows illustrated in FIGS. 5 and 6 do not require the steps be performed in a specific order.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method of adding a new device to a device group, wherein the device group comprises at least one device that hosts a trusted module, wherein each device and each trusted module hosted by a device in the device group possesses device keys for encryption of messages, the method comprising:
   generating device keys of one or more trusted modules in the device group, device keys of one or more devices in the device group and a device key of the new device;
   distributing the generated device keys to each of the one or more trusted modules in the device group;
   distributing the generated device keys to each of the one or more devices in the device group, such that each device in the device group receives the device key of the new device, the device keys of the one or more trusted modules in the device group, and the device keys of other devices in the device group, except for its own device key;
   establishing a secure authenticated channel between a trusted module of the one or more trusted modules and the new device; and
   sending to the new device the generated device keys, except for the device key of the new device itself.

2. The method according to claim 1, further comprising:
   receiving from the new device, over the secure authenticated channel, any keys that are generated by the new device, and
   distributing the received keys to each of the one or more trusted modules and one or more devices in the device group, except for the device key of the device itself.

3. The method according to claim 1, wherein the device key of each of the one or more trusted modules and the device key of each of the one or more devices in the device group is generated by performing a one-way function on an existing key of each of the trusted modules and devices in the device group.

4. The method according to claim 1, wherein all the device keys are generated by the trusted module of the one or more trusted modules, and
   wherein the trusted module of the one or more trusted modules in the device group possesses device keys of all trusted modules in the device group and device keys of all devices in the device group, and
   wherein each device in the device group possesses the device keys of all trusted modules and the device keys of all other devices in the device group, except its own device key.

5. The method according to claim 1, wherein the device key of the new device is generated randomly.

6. The method according to claim 1, wherein all the device keys are distributed to all trusted modules in the device group by encrypting the device keys in a message using a key that is constructed from existing device keys of all the devices in the device group.

7. The method according to claim 1, wherein the device keys are distributed to each device in the device group by encrypting all the device keys, except the device key of the device for which the message is intended, in a message using a key that is constructed from existing device keys of all non-addressed devices in the device group.

8. A method of adding a new device to a device group, wherein the device group comprises at least one device that hosts a trusted module, and wherein the new device to be added hosts a trusted module, wherein each device and each trusted module hosted by a device in the device group possesses device keys for encryption of messages, the method comprising:

generating device keys of one or more trusted modules in the device group, device keys of one or more devices in the device group, a device key of the new device and a device key of the trusted module hosted by the new device;

distributing the generated device keys to each of the one or more trusted modules in the device group;

distributing the generated device keys to each of the one or more devices in the device group, such that each device in the device group receives the device key of the new device, the device key of the trusted module hosted by the new device, the device keys of the one or more trusted modules in the device group and the device keys of other devices in the device group, except for its own device key;

establishing a secure authenticated channel between a trusted module of the one or more trusted modules in the device group and the trusted module hosted by the new device;

sending to the trusted module hosted by the new device the generated device keys; and sending to the new device the generated device keys, except for the device key of the new device itself.

9. The method according to claim 8, further comprising:

receiving from the trusted module hosted by the new device, over the secure authenticated channel, any keys that are generated by the trusted module hosted by the new device, and distributing the received keys to each of the one or more trusted modules and one or more devices in the device group, except for the device key of the device itself.

10. The method according to claim 8, wherein the device key of each of the one or more trusted modules and the device key of each of the one or more devices in the device group is generated by performing a one-way function on an existing key of each of the trusted modules and devices in the device group.

11. The method according to claim 8, wherein all the device keys are generated by the trusted module of the one or more trusted modules, and wherein the trusted module of the one or more trusted modules in the device group possesses device keys of all trusted modules in the device group and device keys of all devices in the device group, and wherein each device in the device group possesses the device keys of all trusted modules and the device keys of all other devices in the device group, except its own device key.

12. The method according to claim 8, wherein the device key of the new device and the device key of the trusted module hosted by the new device are generated randomly.

13. The method according to claim 8, wherein all the device keys are distributed to all trusted modules in the device group by encrypting the device keys in a message using a key that is constructed from existing device keys of all the devices in the device group.

14. The method according to claim 8, wherein the device keys are distributed to each device in the device group by encrypting all the device keys, except the device key of the device for which the message is intended, in a message using a key that is constructed from existing device keys of all non-addressed devices in the device group.

15. A method of adding a new device to a device group, wherein the device group comprises n (n>0) devices, with at least one of the devices hosting a trusted module, wherein each device and each trusted module hosted by a device in the device group possesses key material with which it can encrypt messages to the whole device group or to any subset of the device group, such that only addressed devices can decrypt the messages under a k-resilient scheme (k>1), the method comprising:

generating, for subsets of the device group that have at most k−1 members, extended with the new device, so for subsets of at most k member devices, key material per subset to encrypt messages that can be decrypted by all devices except the devices in said subset of the device group and except the new device;

distributing the generated key materials to one or more trusted modules in the device group;

distributing the generated key material per subset to devices in the device group that are not part of said subset of the device group;

establishing a secure authenticated channel between the trusted module and the new device; and sending to the new device generated device key materials except key materials of said subsets to which the new device belongs.

16. The method according to claim 15, further comprising:

receiving from the new device, over the secure authenticated channel, any key materials that are generated by the new device, and distributing the received key materials to each of the one or more trusted modules and the received key material per subset to devices in the device group that are not part of said subset of the device group.

17. A method of adding a new device to a device group, wherein the device group comprises n (n>0) devices, with at least one of the devices hosting a trusted module, wherein the new device to be added hosts a trusted module, wherein each device and each trusted module hosted by a device in the device group possesses key material with which it can encrypt messages to the whole device group or to any subset of the device group, such that only addressed devices can decrypt the messages under a k-resilient scheme (k>1), the method comprising:

generating, for subsets of the device group that have at most k−1 members, extended with the new device, so for subsets of at most k member devices, new key material per subset to encrypt messages that can be decrypted by all devices except the devices in said subset of the device group and except the new device;

distributing the generated key materials to one or more trusted modules in the device group;

distributing the generated key material per subset to devices in the device group that are not part of said subset of the device group;

establishing a secure authenticated channel between the trusted module hosted by the at least one of the devices in the device group and the trusted module hosted by the new device;

sending the generated device key materials to the trusted module hosted by the new device; and sending to the new device the generated key materials except key materials of said subsets to which the new device belongs.

18. The method according to claim 17, further comprising:

receiving from the new device, over the secure authenticated channel, any key materials that are generated by the trusted module hosted by the new device, and distributing the received key materials to each of the one or more trusted modules and the received key material per subset to devices in the device group that are not part of said subset of the device group.

* * * * *